(12) United States Patent
Magarill et al.

(10) Patent No.: US 7,411,735 B2
(45) Date of Patent: Aug. 12, 2008

(54) ILLUMINATION SYSTEM INCORPORATING COLLIMATED LIGHT SOURCE

(75) Inventors: Simon Magarill, Cincinnati, OH (US); Roy A. Auerbach, Cincinnati, OH (US)

(73) Assignee: 3M Innovative Property Company, St. Paul, MN (US)

( * ) Notice: Subject to any disclaimer, the term of this patent is extended or adjusted under 35 U.S.C. 154(b) by 255 days.

(21) Appl. No.: 11/296,147

(22) Filed: Dec. 6, 2005

(65) Prior Publication Data
US 2007/0127245 A1 Jun. 7, 2007

(51) Int. Cl.
G02B 27/30 (2006.01)
(52) U.S. Cl. .................................... 359/641
(58) Field of Classification Search ................ 359/641, 359/250; 362/291, 592, 599
See application file for complete search history.

(56) References Cited

U.S. PATENT DOCUMENTS

| | | | |
|---|---|---|---|
| 2,373,565 | A | 4/1945 | Hupp |
| 4,518,232 | A | 5/1985 | Dagenais |
| 4,656,562 | A | 4/1987 | Sugino |
| 5,625,738 | A | 4/1997 | Magarill |
| 5,745,153 | A | 4/1998 | Kessler et al. |
| 5,761,355 | A * | 6/1998 | Kuper et al. .................. 385/36 |
| 5,808,657 | A | 9/1998 | Kurtz et al. |
| 5,841,579 | A | 11/1998 | Bloom et al. |
| 5,923,475 | A | 7/1999 | Kurtz et al. |
| 5,969,876 | A | 10/1999 | Kreitzer et al. |
| 6,243,407 | B1 | 6/2001 | Mooradian |
| 6,301,057 | B1 | 10/2001 | Kreitzer |
| 6,332,688 | B1 | 12/2001 | Magarill |
| 6,404,797 | B1 | 6/2002 | Mooradian |
| 6,417,971 | B1 | 7/2002 | Moskovich |
| 6,577,429 | B1 | 6/2003 | Kurtz et al. |
| 6,594,090 | B2 | 7/2003 | Kruschwitz et al. |
| 6,614,827 | B1 | 9/2003 | Mooradian |
| 6,847,485 | B2 | 1/2005 | Kathman et al. |
| 6,870,650 | B2 | 3/2005 | Kappel et al. |
| 7,158,305 | B2 * | 1/2007 | Raghunandan et al. ...... 359/599 |
| 7,245,802 | B2 * | 7/2007 | Tanaka ......................... 385/31 |
| 2002/0114167 | A1 | 8/2002 | Schmidt et al. |
| 2002/0114573 | A1 | 8/2002 | Schmidt et al. |
| 2002/0118946 | A1 | 8/2002 | Wagner |
| 2004/0032659 | A1 * | 2/2004 | Drinkwater .................. 359/558 |
| 2004/0213514 | A1 | 10/2004 | Tanaka et al. |
| 2005/0057727 | A1 | 3/2005 | Troyer |
| 2005/0155956 | A1 | 7/2005 | Hamada et al. |
| 2005/0168837 | A1 | 8/2005 | Pawlowski et al. |
| 2007/0070302 | A1 * | 3/2007 | Govorkov et al. ............. 353/94 |

FOREIGN PATENT DOCUMENTS

WO   WO 00/73013   12/2000

* cited by examiner

Primary Examiner—Hung X. Dang
Assistant Examiner—Vipin M Patel (57) ABSTRACT

An optical system and a projection system incorporating same are disclosed. The optical system includes a light source that is capable of emitting light. The emitted light includes one or more substantially collimated discrete light beams. The optical system further includes a lenslet array for receiving and transmitting the emitted light. Each discrete light beam in the emitted light has an intensity full width at half maximum (FWHM) at the lenslet array that covers at least a portion of a plurality of lenslets in the lenslet array. The optical system further includes an optical element for receiving the transmitted light from an input face of the optical element. The optical element homogenizes the received light and transmits the homogenized light from an output face of the optical element.

27 Claims, 8 Drawing Sheets

ILLUMINATION SYSTEM INCORPORATING COLLIMATED LIGHT SOURCE

FIELD OF THE INVENTION

This disclosure generally relates to illumination systems, and is particularly applicable to illumination systems employing one or more collimated light sources.

BACKGROUND

Illumination systems typically include a light source and illumination optics for transferring light from the light source to a desired destination. Illumination systems are employed in various applications, such as projection displays and backlights for liquid crystal displays (LCD). The light source in an illumination system may, for example, include an arc lamp such as a mercury arc lamp, an incandescent lamp, a fluorescent lamp, a light emitting diode (LED), or a laser.

Projection systems typically include an active light valve for producing an image, an illumination system for illuminating the light valve, and optics for projecting and displaying the image typically on a projection screen. The illumination system in a projection system typically uses one or more white light sources, such as arc lamps. The illumination optics of the illumination system may include means for separating the white light into different colors, such as red, green, and blue.

It is often desirable to uniformly illuminate the light valve. As such, the illumination system commonly employs a homogenizer to homogenize light emitted by the light source.

SUMMARY OF THE INVENTION

Generally, the present invention relates to illumination systems. The present invention also relates to illumination systems employed in projection systems.

In one embodiment of the invention, an optical system includes a light source that is capable of emitting light. The emitted light includes one or more substantially collimated discrete light beams. The optical system further includes a lenslet array for receiving and transmitting the emitted light. Each discrete light beam in the emitted light has an intensity full width at half maximum (FWHM) at the lenslet array that covers at least a portion of a plurality of lenslets in the lenslet array. The optical system further includes an optical element. The optical element receives the transmitted light from an input face of the optical element. The optical element further homogenizes the received light and transmits the homogenized light from an output face of the optical element.

In another embodiment of the invention, an optical system includes one or more light sources. Each light source is capable of emitting a substantially collimated light beam. The optical system further includes a lenslet array. The lenslet array receives and expands light emitted by the one or more light sources. The optical system further includes an optical homogenizer. The homogenizer homogenizes light expanded by the lenslet array. A ratio of an intensity full width at half maximum (FWHM) of each emitted collimated light beam at the lenslet array to a lenslet outer diameter is at least 1.05.

BRIEF DESCRIPTION OF DRAWINGS

The invention may be more completely understood and appreciated in consideration of the following detailed description of various embodiments of the invention in connection with the accompanying drawings, in which.

DETAILED DESCRIPTION

The present invention generally relates to illumination systems. The invention is also applicable to projection systems that include an illumination system and a light valve where it is desirable to illuminate the light valve uniformly with high intensity light. The invention is particularly applicable to illumination and projection systems that include one or more light sources capable of emitting collimated light sources, such as laser light sources.

In the specification, a same reference numeral used in multiple figures refers to the same or similar elements having the same or similar properties and functionalities.

Laser sources have been used in illumination and projection systems. For example, U.S. Patent Publication No. 2005/0057727 discloses a laser projection system in which a collimated visible laser source illuminates an image forming liquid crystal light valve by scanning the light valve. Recently, compact high power semiconductor lasers have been disclosed. For example, U.S. Pat. No. 6,243,407 discloses a vertical cavity surface emitting laser (VCSEL) capable of generating several tens of watts of output power. High power laser sources employed in a projection system can increase brightness and contrast of a projected image.

The present invention discloses illumination and projection systems having one or more collimated light sources. The light sources can, for example, be laser light sources. Known illumination systems employing laser light sources, such as those disclosed in U.S. Pat. No. 5,923,475, often incorporate one or more lenslet arrays where each laser light source has a dedicated lenslet in each of the lenslet arrays in the illumination system. Such illumination systems require precise alignment between each laser source and its corresponding lenslets, as a small misalignment can substantially affect illumination uniformity and angular distribution of the light. One advantage of the present invention is that the collimated light sources can provide uniform illumination with little or no need for precise alignment between individual collimated light sources and other components in the illumination system. The advantage allows, for example, use of less accurately dimensioned, and thus less expensive components in an illumination or projection system. The advantage further eliminates or reduces the need for precise positioning of optical components, such as light sources, in an illumination or projection system.

Another advantage of the present invention is that the angular intensity distribution of the output of an illumination system or, equivalently, the far field intensity distribution of the output is not a sensitive function of accurate alignment between individual collimated light sources and other components in the illumination system. This advantage allows use of smaller components such as lenses or aperture stops, thereby reducing cost and overall foot print size of the illumination system.

The present invention further discloses means for reducing or eliminating speckle (or speckle noise) that may exist, for example, when one or more coherent light sources, such as laser light sources, are used in an illumination or projection system. Speckle is typically an interference pattern and a characteristic of coherent imaging. Speckle can degrade image quality and as such, it is often desirable to reduce speckle in an illumination or projection system.

Figure 1A:
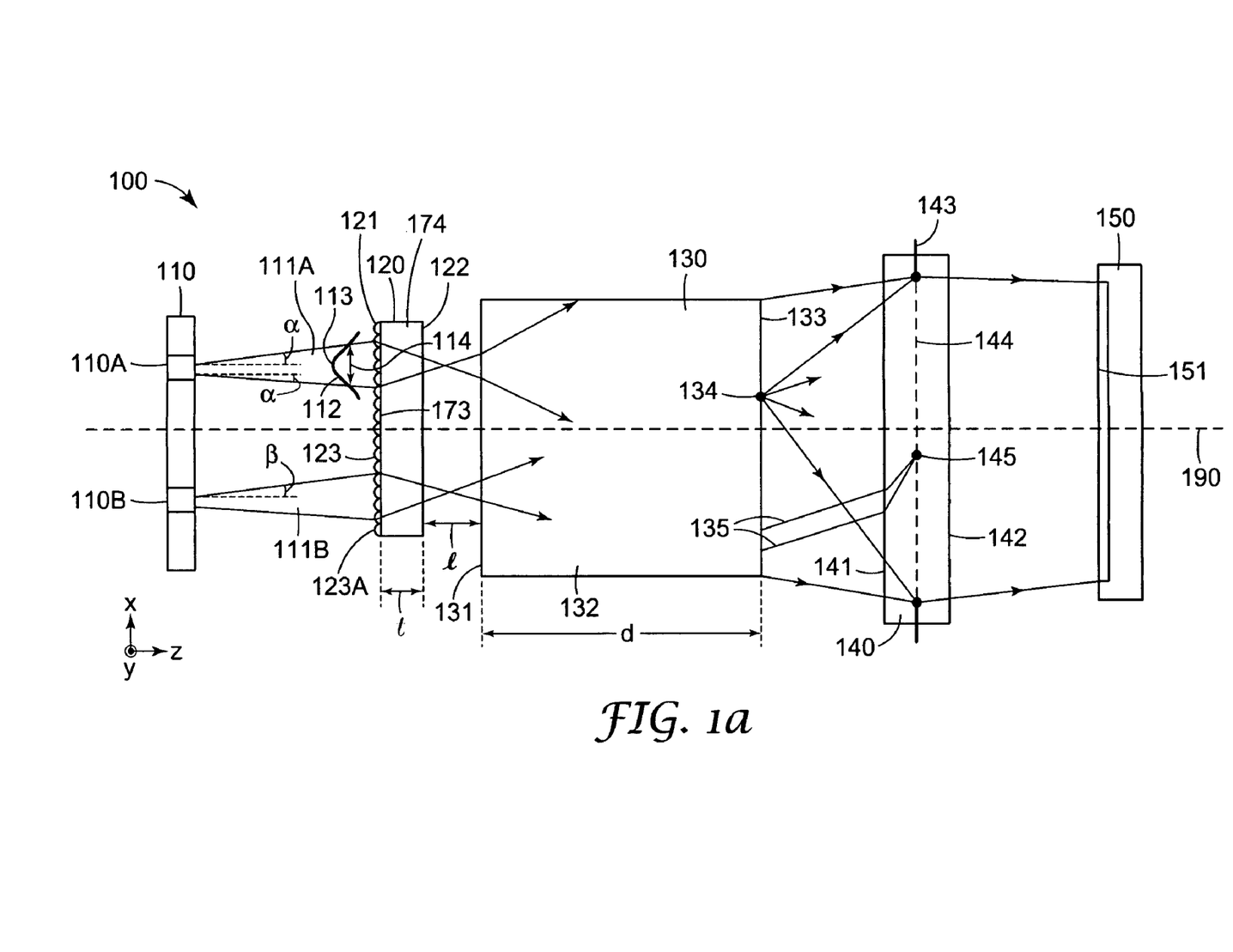
FIG. 1a shows a schematic side-view of an illumination system in accordance with one embodiment of the invention.

FIG. 1a is a schematic side-view of an illumination system 100 in accordance with one embodiment of the invention. Illumination system 100 is centered on an optical axis 190 and includes a light source assembly 110, a lens 120, an optical homogenizer 130, an optical transfer system 140, and a light modulator 150. Light source assembly 110 includes one or more light sources, such as light sources 110A and 110B, each emitting a substantially collimated light beam, such as collimated light beams 111A and 111B, respectively. Each emitted substantially collimated light beam has a half divergence angle. For example, collimated light beam 111A has a half divergence angle $\alpha$ and collimated light beam 111B has a half divergence angle $\beta$. Each light beam can have different half divergence angles along different directions. For example, light beam 111A propagates along the z-axis and has a half divergence angle $\alpha$ in the xz-plane, but may have a different half divergence angle in, for example, the yz-plane. According to one embodiment of the invention, the maximum half divergence angle of each emitted collimated light beam is less than 2 degrees, preferably less than 1.5 degrees, and more preferably less than 1.0 degree. In some applications, the maximum half divergence angle of each emitted collimated light beam is less than 0.75 degrees and preferably less than 0.5 degrees.

Light source assembly 110 can include a single light source. In some applications, light source assembly 110 can include a plurality of discrete light sources arranged, for example, in one or more rows or in any pattern that may be desirable in an application. Light source assembly 110 can include a plurality of discrete light sources that lie in a plane. In some applications, light source assembly 110 can include a three-dimensional array of discrete light sources, arranged on, for example, a spherical, ellipsoidal, parabolic, hyperbolic, planar, or any other suitable surface.

Light source 110A can be any light source that is capable of emitting substantially collimated light, such as a laser light source.

Each emitted substantially collimated light beam has an intensity profile in a direction normal to the propagation direction. For example, collimated light beam 111A propagates along the z-axis and has a two-dimensional intensity profile in xy-plane. The intensity profile may be different along different directions in the xy-plane. For example, collimated light beam 111A can have an intensity profile 112 along the x-direction in the xy-plane that may be different than the intensity profile along the y-direction. Intensity profile 112 has a peak intensity 113 and an intensity full width at half maximum (FWHM) 114.

Lens 120 has a first surface 121, a second surface 122, and a nominal thickness t, where t is, for example, the average distance between surfaces 121 and 122. First surface 121 includes a lenslet array 123 which includes a plurality of lenslets, such as lenslet 123A. The lenslets can be all positive, all negative, or a combination of positive and negative lenslets. According to one embodiment of the invention, a light intensity FWHM of each emitted collimated light beam at the lenslet array covers at least a portion of a plurality lenslets. For example, intensity FWHM 114 of collimated light beam 111A covers at least a portion of 5 lenslets. Each lenslet in lenslet array 123 has an inner diameter which is the diameter of the largest circle that can be enclosed by the lenslet. Similarly, each lenslet in lenslet array 123 has an outer diameter which is the diameter of the smallest circle that can enclose the lenslet.

According to one embodiment of the invention, the ratio of an intensity FWHM of an emitted collimated light beam at the lenslet array 123 to an outer diameter of a lenslet in the lenslet array is preferably no less than 0.94, more preferably no less than 0.97, and even more preferably no less than 1.0. In some applications, the ratio of an intensity FWHM of an emitted collimated light beam at the lenslet array 123 to an outer diameter of a lenslet in the lenslet array is preferably no less than 1.05, more preferably no less than 1.10, and even more preferably no less than 1.15.

According to another embodiment of the invention, the ratio of the smallest intensity FWHM among all the emitted collimated light beams at the lenslet array 123 to the largest finite outer diameter among all the lenslets in the lenslet array is preferably no less than 0.94, more preferably no less than 0.97, and even more preferably no less than 1.0. In some applications, the ratio of the smallest intensity FWHM among all the emitted collimated light beams at the lenslet array 123 to the largest finite outer diameter among all the lenslets in the lenslet array is preferably no less than 1.05, more preferably no less than 1.10, and even more preferably no less than 1.15.

According to one embodiment of the invention, an emitted collimated light beam covers at least a portion of 4 lenslets, preferably at least a portion of 7 lenslets, and more preferably at least a portion of 9 lenslets. According to another embodiment of the invention, each emitted collimated light beam covers at least a portion of 4 lenslets, preferably at least a portion of 7 lenslets, and more preferably at least a portion of 9 lenslets. The exemplary illumination system 100 in which each emitted collimated light beam covers at least a portion of a plurality of lenslets in lenslet array 123 provides uniform illumination and a far field intensity distribution that are not sensitive to precise alignment between the individual emitted collimated light beams and the lenslets in lenslet array 123.

For simplicity and ease of illustration, FIG. 1a shows lenslet array 123 focusing each of the incident collimated light beams at a single focal point. In general, an incident collimated light beam may be focused at a plurality of focal points that correspond to the lenslets illuminated by the incident collimated light beam. One advantage of an illumination system 100 where each incident collimated light beam illuminates a plurality of lenslets is that the incident light is focused at a plurality of focal points thereby reducing speckle in the illumination system.

Figure 1B:
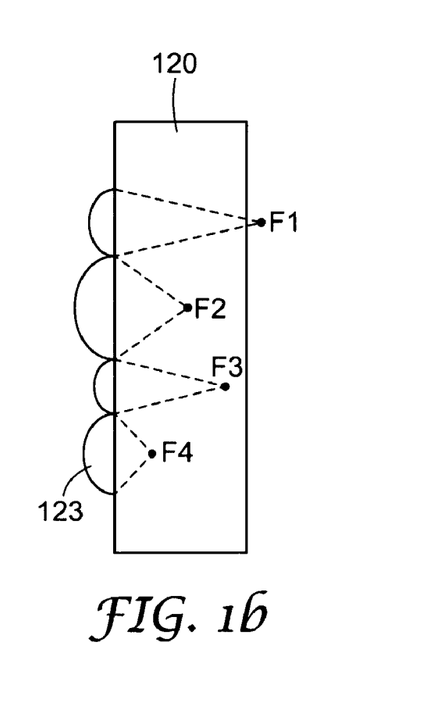
FIG. 1b shows a schematic side-view of an exemplary portion of the lenslet array shown in FIG. 1.
Figure 1C:
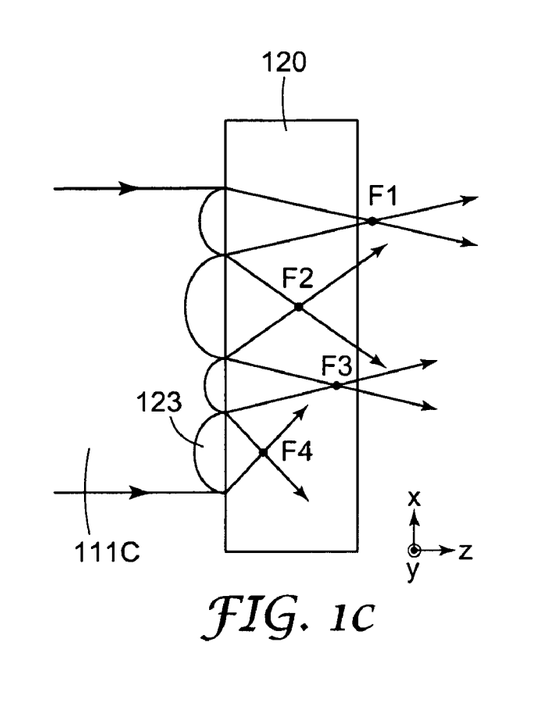
FIG. 1c shows expansion of a collimated light by the lenslets of FIG. 1b.
Figure 1D:
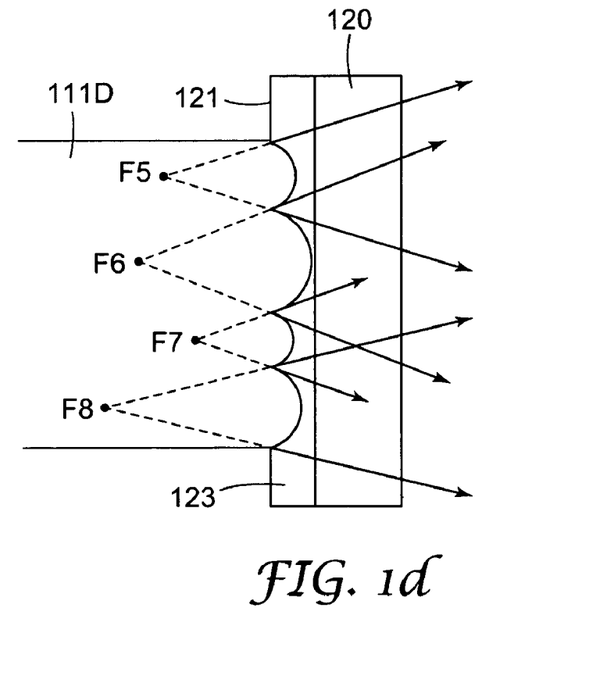
FIG. 1d shows a schematic side-view of another exemplary portion of the lenslet array shown in FIG. 1.

Each lenslet in lenslet array 123 has one or more focal points. The focal points of the lenslets may or may not lie in the same plane. For example, FIG. 1b shows four exemplary positive lenslets from lenslet array 123 having focal points F1, F2, F3, and F4, respectively, where the four focal points do not lie in the same plane. FIG. 1c illustrates expansion of an incident substantially collimated light beam 111C by the four lenslets shown in FIG. 1b. Collimated light beam 111C is effectively split into four smaller light beams which are focused at focal points F1-F4. The focused beams subsequently expand as they propagate along the z-axis. FIG. 1d shows four exemplary negative lenslets from lenslet array 123 having respective virtual focal points F5, F6, F7, and F8, where the four virtual focal points do not lie in the same plane. In such a case, an incident substantially collimated light beam 111D is effectively split into four smaller light beams each of which expands once refracted by a corresponding lenslet. One advantage of an illumination system 100 in which the focal points of the lenslets do not lie in the same plane is reduced speckle.

According to one embodiment of the invention, the ratio of a lenslet outer diameter to a focal length of the lenslet is the same for all the lenslets in lenslet array 123. The lenslets, however, may have different focal lengths and/or outer diameters. According to another embodiment of the invention, the lenslets in lenslet array 123 have substantially the same outer diameter, but at least some of the lenslets have different focal lengths.

Different lenslets in lenslet array 123 can have different optical powers, where an optical power may be positive or negative. Lenslet array 123 may be an array of linear or two-dimensional lenslets. Furthermore, the lenslets in lenslet array 123 may or may not be closely packed, although in a preferred embodiment of the invention, the lenslets are closely packed to, for example, improve uniformity of light delivered to light modulator 150.

A lenslet in lenslet array 123 can have different shapes such as, a square shape, a hexagonal shape, a rectangular shape, or any other shape that may be suitable in an application. Furthermore, different lenslets in lenslet array 123 can have different shapes, different inner diameters, and/or different outer diameters. A lenslet in lenslet array 123 may be a spherical lens, a cylindrical lens, an aspherical lens, or any other type of lens that may be desirable in an application.

According to one embodiment of the invention, lens 120 is capable of expanding each incident collimated beam. In the exemplary embodiment shown in FIG. 1a, lenslets in lenslet array 123 are plano-convex. In this case, lens 120 first focuses each incident collimated light beam and then expands each focused beam as illustrated, for example, in FIG. 1c. Some or all of the lenslets in lenslet array 123 can be plano-convex, in which case an incident collimated light beam can be expanded once transmitted by first surface 121. In general, a lenslet in lenslet array 123 can be any lenslet desired in an application, such as a biconcave lenslet, a biconvex lenslet, a concave-convex lenslet, or a convex-concave lenslet, or any other type lenslet that may be suitable in a given application.

In the exemplary illumination system shown in FIG. 1a, the lenslets in lenslet array 123 are formed on a surface 173 of substrate 174. In some illumination systems, the lenslets in lenslet array 123 and substrate 174 may form a unitary system by, for example, molding the lenslets directly onto surface 173 of substrate 174.

Optical element 130 in FIG. 1a is primarily designed to homogenize light that is transmitted by lens 120, where by homogenizing it is meant that light exiting optical element 130 has a more uniform spatial intensity distribution than light entering optical element 130. Examples of known light homogenizers may be found in U.S. Pat. Nos. 5,625,738 and 6,332,688; and U.S. Patent Application Publication Nos. 2002/0114167, 2002/0114573, and 2002/0118946.

Optical element 130 has an input face 131, an optical rod 132 having a length "d," and an output face 133. Optical element 130 receives light that is transmitted by lens 120 from input face 131, homogenizes the received light as the light propagates along the length of the optical rod, and transmits a homogenized light from output face 133 of the optical element.

Input face 131, output face 133, and a cross-section of optical rod 132 can have any shape such as a rectangle, a trapezoid, a square, an ellipse or any other shape that may be desirable in an application. Input face 131, output face 133, and a cross-section of optical rod 132 can have different shapes. For example, input face 131 can be a circle while output face 133 can be a square. A cross-section of optical rod 132 can be different at different locations along the optical rod. For example, optical rod 132 may be tapered along its length along optical axis 190. The optical rod can taper inwardly or outwardly along the optical axis. The sides of a cross-section of optical rod 132 may be straight or curved. An example of a tapered optical rod is described in U.S. Pat. No. 6,332,688.

Homogenizer 130 can have any three-dimensional shape, for example, a polyhedron, such as a hexahedron. A portion of or the entire homogenizer 130 can be solid or hollow. Homogenizer 130 may homogenize the received light by any suitable optical method such as reflection, total internal reflection, refraction, scattering, or diffraction, or any combination thereof, or any other method that may be suitable for homogenizing the received light.

FIG. 1a shows a straight optical axis 190 and a straight optical element 130. In general, optical axis 190 can be folded at one or more points along the optical axis as desired in an application. In such a case, optical element 130 may also be folded at one or more points along length "d" of optical rod 132.

According to one embodiment of the invention, expansion of the emitted collimated light beams by lens 120 combined with the homogenizing function of optical element 130 delivers a sufficiently spatially uniform light at output face 133 of optical element 130.

According to one embodiment of the invention, a shift of lens 120 in a direction in the xy-plane by a distance no greater than ½ of a lenslet outer diameter changes the spatial uniformity of light at output face 133 (sometimes referred to as a near field intensity distribution) by less than 30%, preferably by less than 20%, and more preferably by less than 15%. In some applications, such a shift changes the spatial uniformity of light at output face 133 by less than 10%, preferably by less than 5%, more preferably by less than 1%, and even more preferably by less than 0.5%.

According to another embodiment of the invention, a shift of lens 120 in a direction in the xy-plane by a distance no greater than ½ of the largest outer diameter among the lenslets in lenslet array 123 changes the spatial uniformity of light at output face 133 by less than 30%, preferably be less than 20%, and more preferably by less than 15%. In some applications, such a shift changes the spatial uniformity of light at output face 133 by less than 10%, preferably by less than 5%, more preferably by less than 1%, and even more preferably by less than 0.5%.

In FIG. 1a, lens 120 and optical homogenizer 130 are separated by a distance "1." In general, distance "1" can be any distance capable of producing a desired result in an application. For example, distance "1" can be sufficiently large to improve uniformity at output face 133. In some applications, distance "1" can be sufficiently small to increase the amount of light received and collected by optical homogenizer 130. In yet some other applications, distance "1" may be zero to, for example, improve mechanical stability and/or reduce the need for maintaining alignment between lens 120 and optical homogenizer 130. The distance "1" may be made zero by, for example, eliminating substrate 174 and forming lenslet array 123 directly on input face 131 of optical homogenizer 130.

According to one embodiment of the invention, lens 120 is optically coupled to optical element 130 by an adhesive layer (not shown in FIG. 1a). As used herein, the term adhesive refers to a material having the ability to join two neighboring layers together by means of surface attachment. The adhesive layer can be optically diffusive, for example, by dispersing small particles in an adhesive host material where the index of refraction of the particles is different than the index of refraction of the adhesive host material. Similarly, lens 120 can be optically diffusive along thickness "t" of the lens.

According to one embodiment of the invention, lens 120 is an integral part of optical element 130, meaning that lens 120 and optical element 130 form a unitary construction. For example, lenslet array 123 can be an integral part of input face 131 of optical homogenizer 130.

Optical transfer system 140 receives light emitted by optical homogenizer 130 from its input face 141, transfers the received light to its output face 142, and delivers the transferred light from its output face to light modulator 150. According to one embodiment of the invention, output face 133 and light modulator 150 form a conjugate pair, meaning that, for example, light modulator 150 lies in an image plane of output face 133.

Optical transfer system 140 includes an aperture stop 143 having an open area 144. According to one embodiment of the invention, output face 133 and aperture stop 144 form a Fourier transform pair, meaning that, in general, every point in output face 133 such as point 134, illuminates substantially the entire open area 144. Furthermore, all light rays exiting output face 133 that propagate along a same direction, such as light rays 135, converge substantially at a respective point, such as point 145 in open area 144.

Optical transfer system 140 can include one or more optical components that are, for example, refractive, reflective, diffractive, or holographic in nature such as a lens, a micro lens array, an optical filter, a color wheel, a mirror, or any other optical component that may be used in optical transfer system 140 to transfer light from optical element 130 to active area 151 of light modulator 150.

Light modulator 150 has an active area 151 that is capable of displaying an image. According to one embodiment of the invention, aperture stop 143 and active area 152 form a Fourier transform pair.

Light modulator 150 can be any light modulator that is capable of displaying an image. Light modulator 150 can be pixelated. For example, light modulator 150 may be a microelectromechanical system (MEMS) such as a digital micromirror device (DMD). A DMD typically includes an array of tiltable micro-mirrors. The tilt of each mirror can be independently controlled by, for example, an electrical signal. The tilting of each mirror (or pixel) allows the mirror to act as a fast and precise light switch. As a result, a DMD can act as a spatial light modulator digitally modulating an incident light to, for example, display an image when illuminated with an incident light. An example of a DMD is a Digital Light Processor™ (DLP™) available from Texas Instruments Company, Dallas, Tex.

Further examples of light modulator 150 include a grating light valve (GLV) discussed, for example, in U.S. Pat. No. 5,841,579, or a liquid crystal display (LCD). An LCD type modulator 150 can, for example, be optically transmissive or reflective, such as a high temperature polysilicon (HTPS) LCD or a liquid crystal on silicon (LCOS) display, respectively.

In general, light modulator 150 can be any electronically switchable device capable of forming an image. In some applications, light modulator 150 may display a static image that can, for example, be refreshed, changed, or otherwise updated as a function of time depending on the particular application.

Light transmitted by optical homogenizer 130 has a near field distribution which is the spatial light intensity distribution at output face 133. Light transmitted by optical element 130 also has a far field or an angular intensity distribution. Far field distribution is, in theory, the spatial intensity distribution of the transmitted light in a plane positioned at infinite distance from output face 133. In practice, the far field distribution can be approximately determined by considering the spatial intensity distribution of the transmitted light in a plane positioned a long distance, such as a few meters, from output face 133.

According to one embodiment of the invention, a shift of lens 120 along a direction in the xy-plane by a distance no greater than ½ of a lenslet outer diameter among the lenslets in lenslet array 123 changes the angular intensity distribution of the light transmitted by homogenizer 130 by less than 40%, preferably by less than 20%, more preferably by less than 10%, more preferably by less than 5.0%, and even more preferably by less than 1.0%.

According to another embodiment of the invention, a shift of lens 120 along a direction in the xy-plane by a distance no greater than ½ of the largest outer diameter among the lenslets in lenslet array 123 changes the angular intensity distribution of the light transmitted by homogenizer 130 by less than 40%, preferably by less than 20%, more preferably by less than 10%, more preferably by less than 5.0%, and even more preferably by less than 1.0%.

Advantages and embodiments of the present invention are further illustrated by the following example. The particular materials, optical parameters such as indices of refraction, and dimensions recited in the example, as well as other conditions and details, should not be construed to unduly limit the present invention.

EXAMPLE 1

An illumination system similar to illumination system 100 of FIG. 1a was numerically analyzed for a substantially collimated light incident on lens 120. The details of system variables and parameters used in the example are described in reference to FIGS. 2-4. A single round incident collimated light beam 111A was used in the analysis. The beam's intensity FWHM along both the x-direction and the y-direction in the xy-plane at surface 131 was 0.2 mm. The beam had a half divergence angle $\alpha$ equal to 0.344 degrees. The wavelength of the beam was 0.532 microns.

In the analysis, lenslet array 123 was a two-dimensional array of closely packed identical square lenslets formed directly on input surface 131 of optical element 130. Each lenslet had a convex first surface as illustrated by lenslet 301 in FIG. 3 with a radius of curvature of 0.3 mm, and a lenslet thickness "P" equal to 0.04 mm. Input face 131 was a rectangle with side dimensions 6.8 mm along the y-axis and 4.0 mm along the x-axis. Optical rod 132 was 40 mm long.

Figure 2:
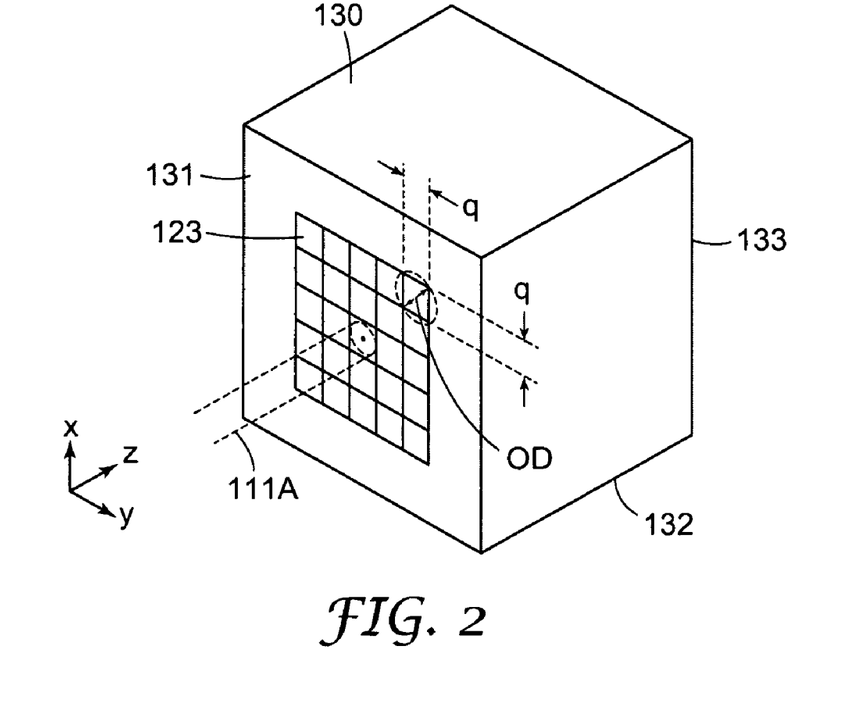
FIG. 2 shows a schematic three-dimensional view of a portion of an illumination system analyzed in Example 1.
Figure 3:
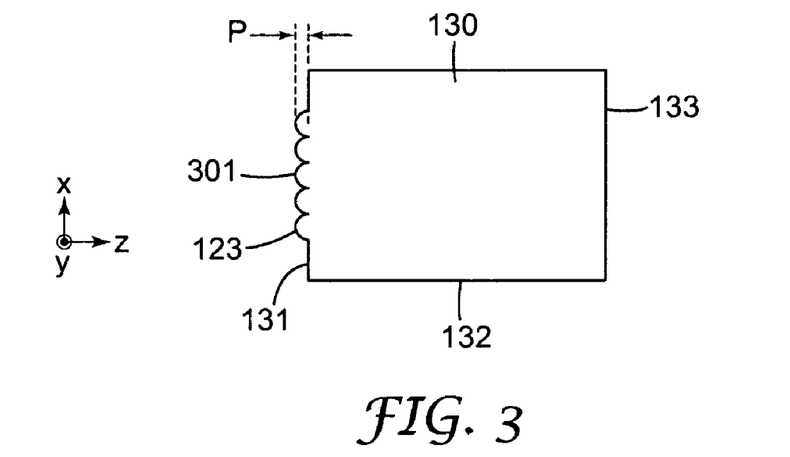
FIG. 3 shows a schematic side-view of a portion of an illumination system analyzed in Example 1.
Figure 4:
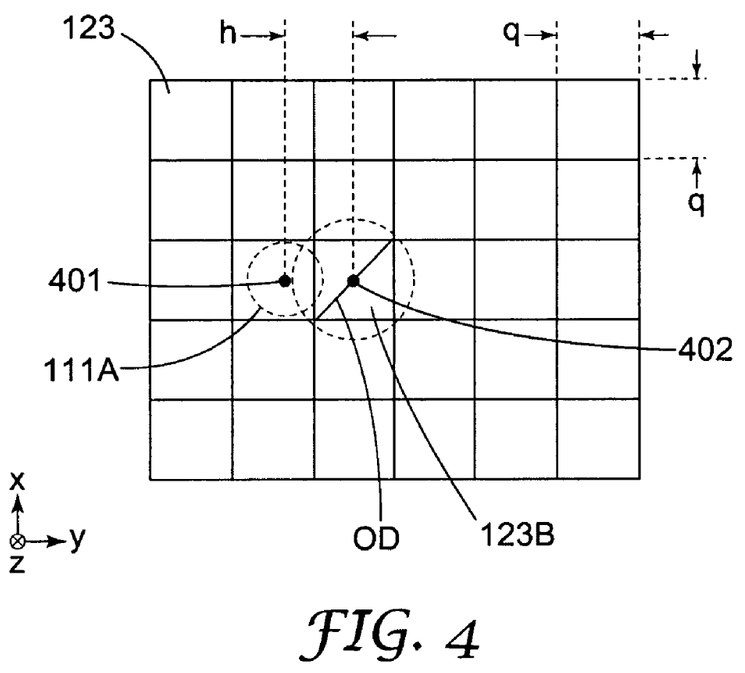
FIG. 4 shows a schematic front-view of a portion of the lenslet array analyzed in Example 1.

There were two variables in the analysis. The first variable was "q," the size of each side of each square lenslet which was also the inner diameter of each square lenslet as shown in FIGS. 2 and 4. The second variable was the size of misalignment, "h," defined as the distance between center 401 of incident collimated beam 111A at lenslet array 123 and center 402 of a designated lenslet 123B as illustrated in FIG. 4.

Three different values were used for h. The first value was h=0, meaning that center 401 was located at center 402. The second value was h=q/4, meaning that center 401 was shifted laterally along the y-axis by a distance equal to one fourth the side of lenslet 123B. The third value was h=q/2, meaning that center 401 was shifted laterally along the y-axis by a distance equal to one half the side of lenslet 123B.

The output of the analysis for each set of variables was D, the smallest half-cone-angle that enclosed the far field distribution of the light transmitted by optical homogenizer 130. In reference to FIG. 1a, D corresponds to the smallest diameter of open area 144 of aperture stop 143 that would transmit substantially all light exiting optical homogenizer 130 meaning that, for example, a larger D would require a larger open area 144, which in general would require other components in the illumination system to be larger as well.

Table 1 shows D for different sets of variables considered in the example:

TABLE I

| q (mm) | OD (mm) | S | h (mm) | D (degrees) | % Change In D |
|---|---|---|---|---|---|
| 0.2 | 0.283 | 0.707 | 0 | 7.5 | 67 |
|  |  |  | 0.05 | 12.5 |  |
|  |  |  | 0.1 | 12.5 |  |
| 0.166 | 0.235 | 0.852 | 0 | 7.1 | 55 |
|  |  |  | 0.041 | 11 |  |
|  |  |  | 0.083 | 11 |  |
| 0.150 | 0.212 | 0.943 | 0 | 7 | 43 |
|  |  |  | 0.038 | 10 |  |
|  |  |  | 0.075 | 10 |  |
| 0.144 | 0.204 | 0.982 | 0 | 6.9 | 33 |
|  |  |  | 0.036 | 9.2 |  |
|  |  |  | 0.072 | 9.2 |  |
| 0.139 | 0.197 | 1.017 | 0 | 7.5 | 17 |
|  |  |  | 0.035 | 8.8 |  |
|  |  |  | 0.069 | 8.8 |  |
| 0.133 | 0.188 | 1.063 | 0 | 8 | 6 |
|  |  |  | 0.033 | 8.5 |  |
|  |  |  | 0.067 | 8.5 |  |
| 0.125 | 0.177 | 1.131 | 0 | 8.5 | 0 |
|  |  |  | 0.031 | 8.5 |  |
|  |  |  | 0.062 | 8.5 |  |

In Table 1, "OD" is the outer diameter of lenslet 123B as shown in FIGS. 2 and 4, and S is the ratio of FWHM to OD. As can be seen from Table 1, for OD=0.283 mm, a misalignment equal to half the size of the lenslet side (i.e., for h=0.1 mm) would result in an increase in D from 7.5 degrees to 12.5 degrees, an increase of close to %67. Similarly, for OD=0.212 mm, a misalignment equal to half the size of the lenslet side (i.e., for h=0.075 mm) would result in an increase in D from 7.0 degrees to 10.0 degrees, an increase of close to %43. On the other hand, for OD=0.188 mm, a misalignment equal to half the size of the lenslet side (i.e., for h=0.067 mm) would result in an increase in D from 8.0 degrees to 8.5 degrees, an increase of only about %6. For OD=0.177 mm, a misalignment of q/4 or q/2 does not change D. Therefore, for S values greater than 1.06 a misalignment between the incident collimated beam and the corresponding lenslet changes the far field distribution by less than 10%. Accordingly, one advantage of the present invention is that for sufficiently large values of S, the far field distribution is both sufficiently small and insensitive to misalignment between an incident collimated light beam and the lenslets in the lenslet array.

Figure 5A:
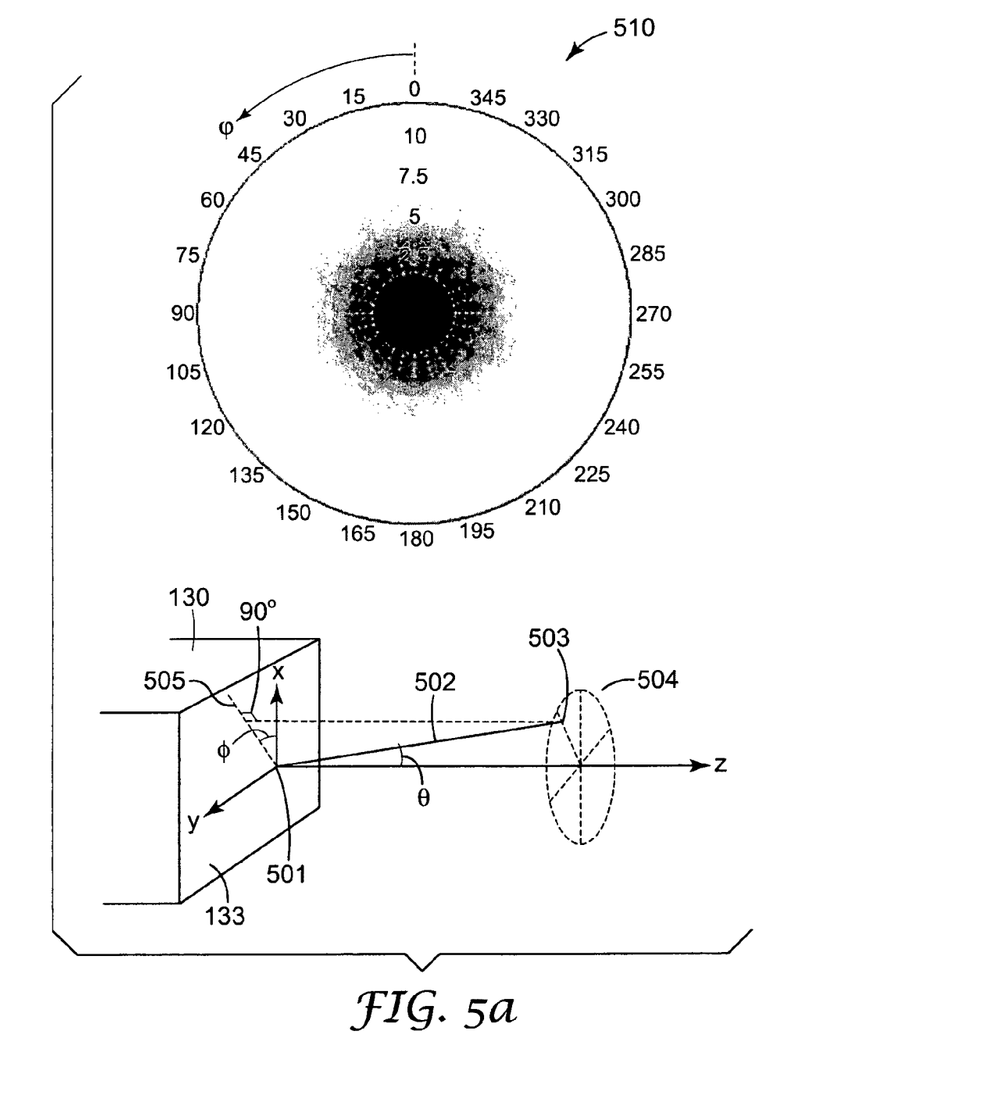
FIGS. 5a-d show the angular intensity distribution for four different sets of variables used in Example 1.
Figure 5B:
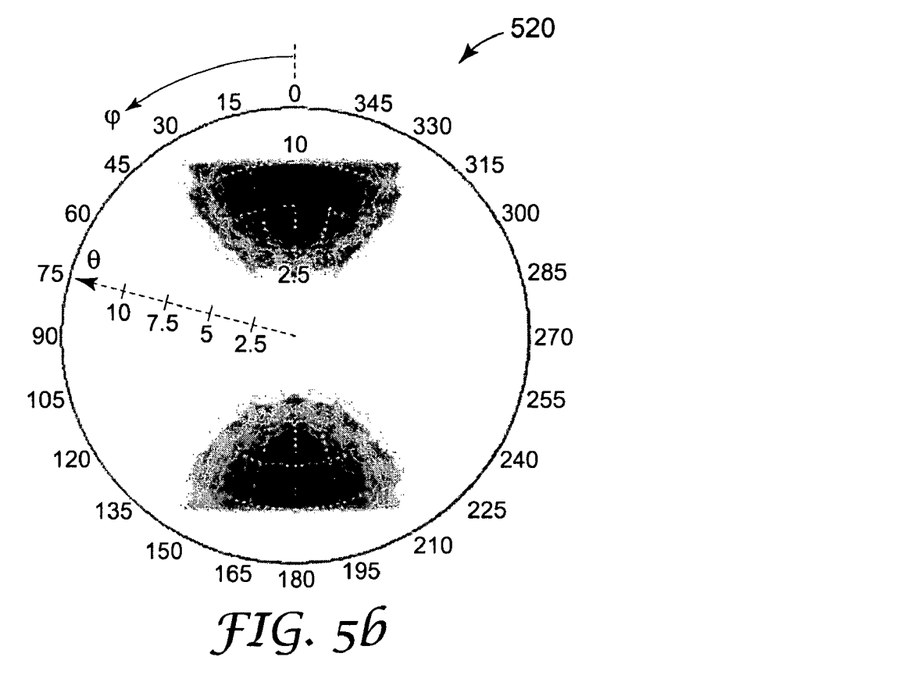
Figure 5C:
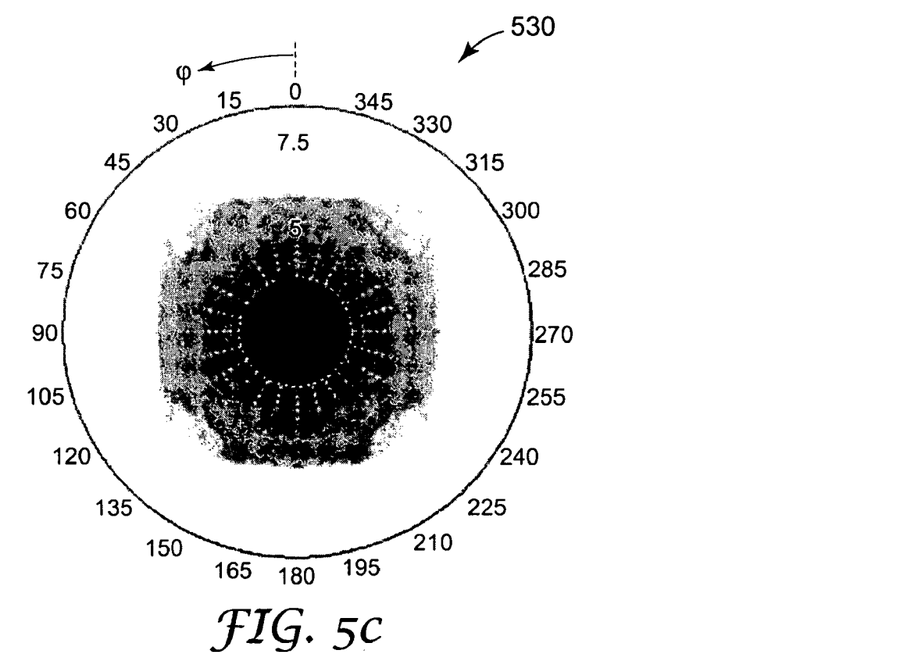
Figure 5D:
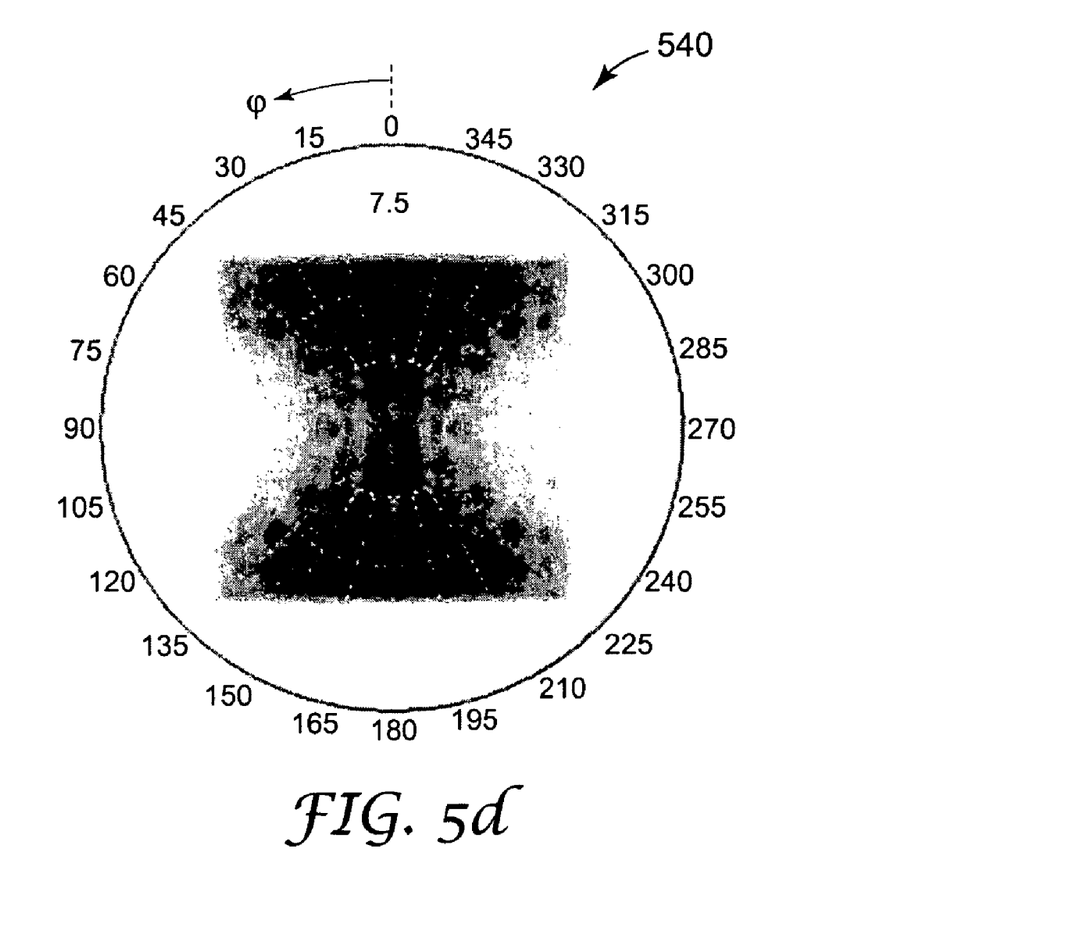

FIGS. 5a-d show the angular intensity distribution for four different sets of variables used in the example. In particular, FIG. 5a shows angular intensity distribution 510 for S=0.707 with zero misalignment, and FIG. 5b shows angular intensity distribution 520 for the same S, but with 0.1 mm misalignment. Similarly, FIG. 5c shows angular intensity distribution 530 for S=1.131 with zero misalignment, and FIG. 5d shows angular intensity distribution 540 for the same S, but with 0.062 mm misalignment. One way to define angles θ and φ is in reference to an arbitrary point 501 at output face 133 of optical homogenizer 130 as shown in FIG. 5a. A light ray 502 that exits output face 133 from point 501 terminates at a point 503 in far field distribution 504. Angle θ is the angle that ray 502 makes with the z-axis. Angle φ is the angle that the projection of ray 502 in the xy-plane (i.e., line 505) makes with the x-axis. As such, D is the smallest angle θ that encloses the far field distribution of the light transmitted by optical homogenizer 130.

FIGS. 5a and 5b show that a misalignment of 0.1 mm causes a substantial increase in the size of the angular intensity distribution, thereby requiring a large open aperture 144 in illumination system 100 of FIG. 1a to accommodate any misalignment that may occur during, for example, manufacturing, assembly, or use of illumination system 100.

In contrast, FIGS. 5c and 5d show one advantage of the invention in that a misalignment of even 0.062 mm does not affect the size of the angular intensity distribution. Accordingly, the invention allows for a greater tolerance in manufacturing and assembly of different components in illumination system 100. The invention can further allow for a greater system operating temperature range as a misalignment between different system components due to thermal expansion and contraction does not substantially affect the overall system performance. Furthermore, the invention allows the use of larger f-number illumination or projection systems by using smaller optical components including smaller open area 144 in aperture 143, thereby reducing cost and overall footprint of the illumination or projection system. The use of a larger f-number system also improves optical performance by, for example, reducing optical aberrations, which in turn reduces cost by allowing the use of fewer and/or less complicated optical components in illumination system 100 or a projection system that includes such an illumination system.

Figure 6:
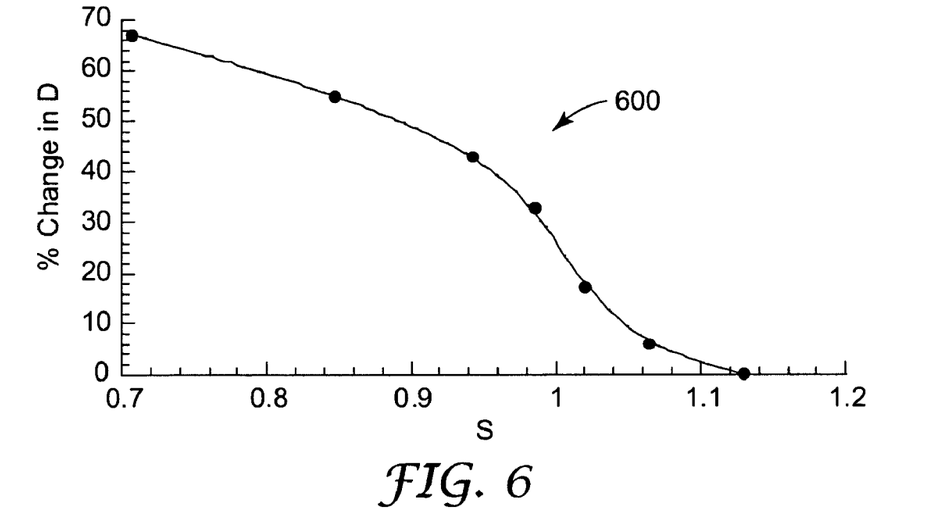
FIG. 6 shows a plot of some of the results disclosed in Example 1.

Some of the results in Table 1 are shown in FIG. 6. In particular, plot 600 shows % change in D for a misalignment equal to half the side of lenslet 123B (see FIG. 4) as a function of S. According to plot 600, % change in D is less than about 25% for S greater than about 1.

Figure 7:
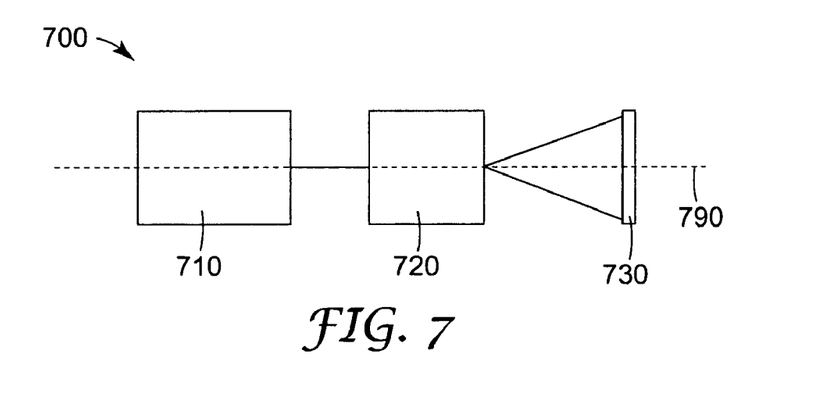
FIG. 7 shows a schematic side-view of a projection system in accordance with one embodiment of the invention.

FIG. 7 shows a schematic side-view of a projection system 700 in accordance with one embodiment of the invention. Projection system 700 includes an illumination system 710, projection optics 720 and a projection screen 730. Illumination system 710 is an illumination system in accordance with any embodiment of the invention, such as illumination system 100 of FIG. 1a. Although FIG. 1a shows a single illumination system, in general, projection system 700 may include more than one illumination system, for example, three illumination systems.

Projection optics 720 projects an image produced by illumination system 710 onto projection screen 730. Projection optics 720 typically includes multiple lenses. Examples of known projection optics are discussed in U.S. Pat. Nos. 6,417,971; 6,301,057; and 5,969,876.

Projection system 700 may be a rear projection system, in which case, projection screen 730 is preferably a rear projection screen. Projection system 700 may be a front projection system, in which case, projection screen 730 is preferably a front projection screen.

Projection system 700 is shown to be centered on a straight optical axis 790. In general, optical axis 790 may be folded at one or more points to, for example, reduce the overall foot print of the projection system.

All patents, patent applications, and other publications cited above are incorporated by reference into this document as if reproduced in full. While specific examples of the invention are described in detail above to facilitate explanation of various aspects of the invention, it should be understood that the intention is not to limit the invention to the specifics of the examples. Rather, the intention is to cover all modifications, embodiments, and alternatives falling within the spirit and scope of the invention as defined by the appended claims.

What is claimed is:

1. An optical system comprising:
   a light source capable of emitting light, the emitted light comprising one or more substantially collimated discrete light beams;
   a lenslet array receiving and transmitting the emitted light, each discrete light beam in the emitted light having an intensity hill width at half maximum (FWHM) at the lenslet array that covers at least a portion of a plurality of lenslets in the lenslet array; and
   an optical element receiving the transmitted light from an input face of the optical element, the optical element homogenizing the received light and transmitting the homogenized light from an output face of the optical element,
   wherein the optical system has an optical axis, and further wherein a shift of the lenslet array normal to the optical axis by half an outer diameter of a lenslet in the lenslet array changes a uniformity of the homogenized light by less than 5%.

2. The optical system of claim 1, wherein the light source comprises a laser light source.

3. The optical system of claim 1, wherein a half divergence angle of each substantially collimated discrete light beam is less than 2 degrees.

4. The optical system of claim 1, wherein a half divergence angle of each substantially collimated discrete light beam is less than 1 degree.

5. The optical system of claim 1, wherein the light source comprises one or more rows of discrete light sources.

6. The optical system of claim 1, wherein the light source comprises a two-dimensional array of discrete light sources.

7. The optical system of claim 1, wherein the light source comprises a three-dimensional array of discrete light sources.

8. The optical system of claim 1, wherein the FWHM of each discrete light beam at the lenslet array covers at least a portion of 4 lenslets.

9. The optical system of claim 1, wherein the FWHM of each discrete light beam at the lenslet array covers at least a portion of 7 lenslets.

10. The optical system of claim 1, wherein the FWHM of each discrete light beam at the lenslet array covers at least a portion of 9 lenslets.

11. The optical system of claim 1, wherein focal points of at least some of the lenslets in the lenslet array do not lie in a same plane.

12. The optical system of claim 1, wherein at least two lenslets in the lenslet array have different optical powers.

13. The optical system of claim 1, wherein each lenslet has a hexagonal shape.

14. The optical system of claim 1, wherein each lenslet has a square shape.

15. The optical system of claim 1, wherein each lenslet has a rectangular shape.

16. The optical system of claim 1, wherein the lenslet array is an integral part of the optical element.

17. The optical system of claim 1, wherein the optical element homogenizes the received light by total internal reflection.

18. The optical system of claim 1, wherein the optical element is tapered.

19. The optical system of claim 1, wherein at least one of the input and output faces of the optical element is a rectangle.

20. The optical system of claim 1, wherein at least one of the input and output faces of the optical element is a square.

21. The optical system of claim 1, wherein at least one of the input and output faces of the optical element is a trapezoid.

22. A projection system comprising the optical system of claim 1.

23. An optical system comprising:
   a light source capable of emitting light, the emitted light comprising one or more substantially collimated discrete light beams;
   a lenslet array receiving and transmitting the emitted light, each discrete light beam in the emitted light having an intensity full width at half maximum (FWHM) at the lenslet array that covers at least a portion of a plurality of lenslets in the lenslet array; and
   an optical element receiving the transmitted light from an input face of the optical element, the optical element homogenizing the received light and transmitting the homogenized light from an output face of the optical element,
   wherein the lenslets in the lenslet array are closely packed.

24. An optical system comprising:
   one or more light sources, each light source capable of emitting a substantially collimated light beam;
   a lenslet array for receiving and expanding each substantially collimated light beam; and
   an optical homogenizer for homogenizing light expanded by the lenslet array, wherein a ratio of an intensity full width at half maximum (FWHM) of each emitted substantially collimated light beam at the lenslet array to a lenslet outer diameter is at least 1.10.

25. The optical system of claim 24, wherein the ratio is at least 1.15.

26. The optical system of claim 24, wherein at least one of the one or more light sources is a laser light source.

27. An optical system comprising,
   one or more light sources, each light source capable of emitting a substantially collimated light beam;
   a lenslet array for receiving and expanding each substantially collimated light beam; and
   an optical homogenizer for homogenizing light expanded by the lenslet array, wherein a ratio of an intensity full width at half maximum (FWHM) of each emitted substantially collimated light beam at the lenslet array to a lenslet outer diameter is at least 1.05,
   wherein the lenslets in the lenslet array are closely packed.

* * * * *

UNITED STATES PATENT AND TRADEMARK OFFICE
CERTIFICATE OF CORRECTION

PATENT NO. : 7,411,735 B2  Page 1 of 1
APPLICATION NO. : 11/296147
DATED : August 12, 2008
INVENTOR(S) : Simon Magarill

It is certified that error appears in the above-identified patent and that said Letters Patent is hereby corrected as shown below:

<u>Title page Item [73] (Assignee)</u>
Line 1, delete "Property" and insert -- Properties --, therefor.

<u>Column 11</u>
Line 19, in Claim 1, delete "hill" and insert -- full --, therefor.

Signed and Sealed this

Fourth Day of November, 2008

JON W. DUDAS
*Director of the United States Patent and Trademark Office*